W. R. BUSS.
MOTOR DRIVE FOR SHAPERS.
APPLICATION FILED MAY 10, 1917.

1,275,215.

Patented Aug. 13, 1918.
2 SHEETS—SHEET 1.

Inventor
Wendell R. Buss
By Moulton & Livnauce
Attorneys.

W. R. BUSS.
MOTOR DRIVE FOR SHAPERS.
APPLICATION FILED MAY 10, 1917.

1,275,215.

Patented Aug. 13, 1918
2 SHEETS—SHEET 2.

Inventor
Wendell R. Buss
By Moulton & Livrance
Attorneys.

UNITED STATES PATENT OFFICE.

WENDELL R. BUSS, OF HOLLAND, MICHIGAN.

MOTOR-DRIVE FOR SHAPERS.

1,275,215.  Specification of Letters Patent.  Patented Aug. 13, 1918.

Application filed May 10, 1917. Serial No. 167,734.

*To all whom it may concern:*

Be it known that I, WENDELL R. BUSS, a citizen of the United States of America, residing at Holland, in the county of Ottawa and State of Michigan, have invented certain new and useful Improvements in Motor-Drives for Shapers; and I do hereby declare the following to be a full, clear, and exact description of the invention, such as will enable others skilled in the art to which it appertains to make and use the same.

This invention relates to a motor drive for shapers or other wood working machines of similar character and it is the object and purpose of the present invention to provide a motor and connect it directly by gearing to the spindle of the shaper which carries the cutters thereof. A further object of the invention is to connect the motor with the spindle in such manner that an adjustment of the spindle by movement of the support on which it is mounted carries with it the motor carried by the same support, there being, in this manner, provided a motor drive for wood working shapers, the driving means and the cutter for the shaper being simultaneously adjustable without the necessity of independent adjustment of each.

In the drawings is shown a practical and operative construction which embodies my invention and in which, Figure 1 is a perspective view of a shaper equipped with my invention.

Like reference characters refer to like parts in the several views of the drawings.

Figure 4:
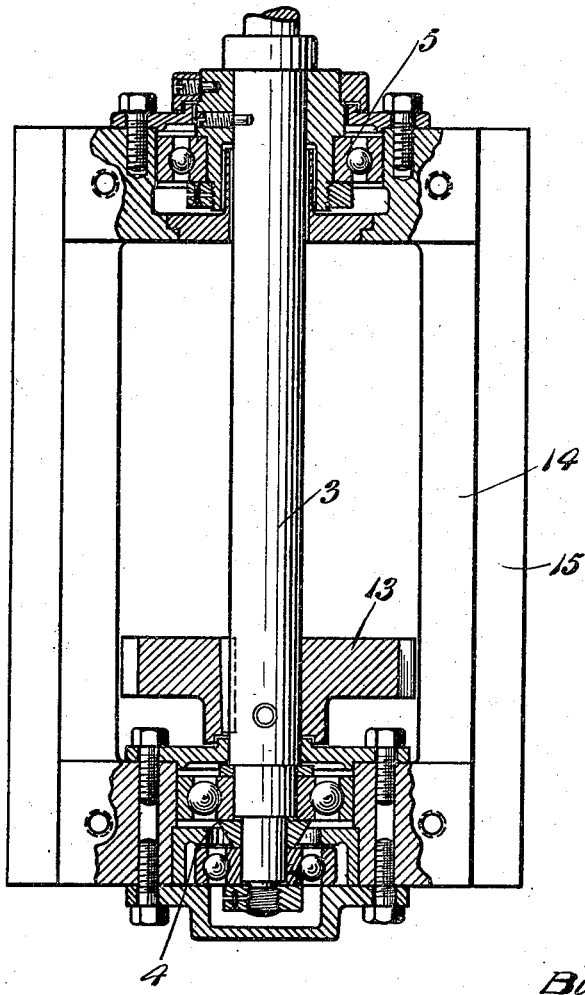
Fig. 4 is a side elevation with bearings shown in section to illustrate the mounting of the spindle of the shaper and Fig. 5 is a detail in section illustrating the construction for adjusting the cutters and parts associated therewith with respect to a stationary table which forms one part of the shaper construction.
Figure 5:
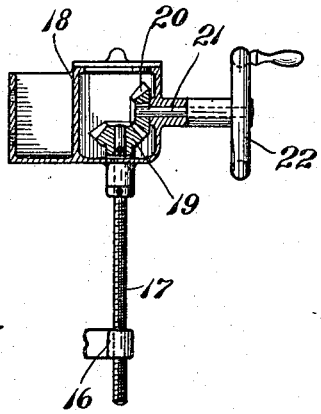

In the construction of the shaper a heavy support 1, preferably of cast iron, is made which carries an upper horizontal table 2 on which the work acted upon by the shaper is laid. A vertical spindle 3 is mounted in suitable lower and upper thrust and ball bearings 4 and 5, said spindle extending through the table and carrying at its upper end a cutter head 6 on which suitable knives may be secured. The upper end of the spindle is rotatably mounted in a bearing 7 supported at the upper end of and extending laterally from a post 8 which also extends upwardly through the table 2. Lower and upper brackets 9 and 10 project laterally from the support for the spindle 3 between which an electric motor 11 is positioned. The shaft of the motor is vertical and suitably mounted at its upper and lower ends in bearings in said brackets 10 and 9 similar to the bearings used, as shown in Fig. 4 for the spindle 3 of the machine. A spur gear 12 is connected to the motor shaft meshing with pinion 13 fixed on the spindle 3.

Figure 1:
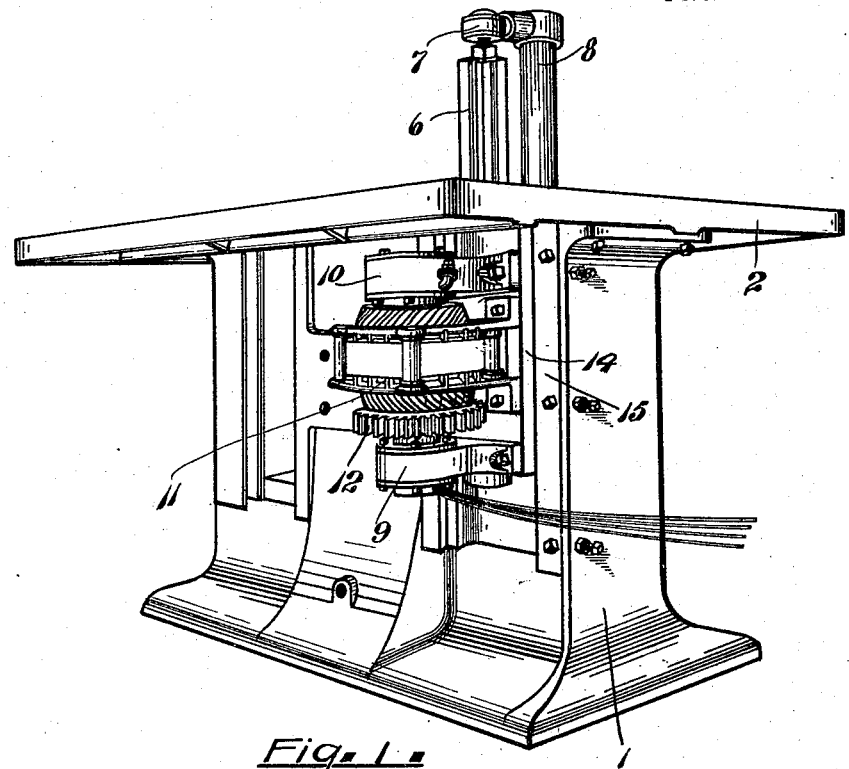
Figure 2:
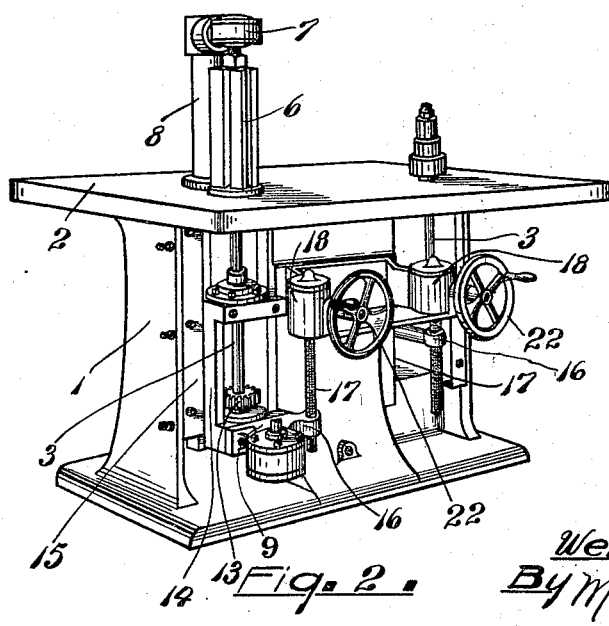
Fig. 2 is a similar view from the opposite side.
Figure 3:
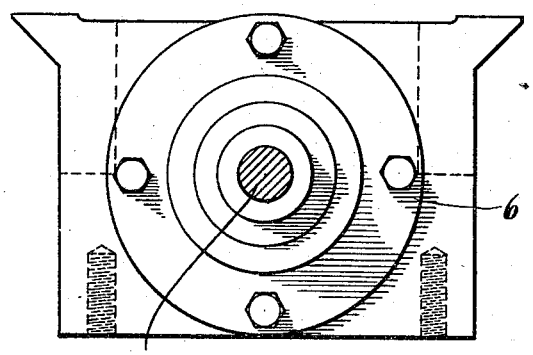
Fig. 3 is a plan view of the cutter head.

In practice it is desirable that the cutter may be vertically adjustable with respect to the table. Accordingly, the spindle 3 and the brackets 9 and 10, as well as the post 8 are connected to a support 14 slidably mounted between guides 15 on the main casting or base 1. An arm 16 projects from the lower bracket 9 through which is threaded a screw 17, the upper end thereof passing into a housing 18 fixed on the main casting 1 and carrying a beveled pinion 19 at its upper end within the housing. A second beveled pinion 20 meshes with pinion 19 being fixed on the inner end of a shaft 21 which extends outwardly through the housing and carries an operating hand wheel 22 at its outer end. It is apparent that rotation of the hand wheel moves the support carrying the spindle and the motor and that all may be adjusted simultaneously. Of course, more than one cutter head and spindle may be mounted on a single base as indicated in Fig. 2, but the construction and adjustment is the same whether one or more cutters are used with a single table.

The construction described is very efficient in practice and does away with the complicated belt drive heretofore considered essential with shapers driven at a very high speed at which wood working machinery must run. The ball and thrust bearings for the cutter spindle and for the motor shaft render the same very easy of operation and the connection of the motor direct to the support which carries the spindle permits a simultaneous movement of both without the necessity of independent adjustments for each.

I claim:—

In a machine of the character described, a supporting base, a horizontal table carried by and above the base, a supporting member mounted for vertical sliding movements on the base, a vertical spindle extending above the table and rotatively mounted on said supporting member, a cutter head carried by the upper portion of the spindle, upper and lower brackets fixed on the supporting member and projecting laterally therefrom, a motor located between the brackets, the ends of the motor shaft having bearings in the brackets, a gear on the motor shaft, a pinion on the spindle meshing with the gear, and means for raising or lowering said supporting member and attached spindle and motor relative to said base and table, substantially as described.

In testimony whereof I affix my signature.

WENDELL R. BUSS.